(12) United States Patent
Johnson-Hovey (10) Patent No.: US 10,905,095 B2
(45) Date of Patent: Feb. 2, 2021

(54) BED FOR AN ANIMAL AND METHOD

(71) Applicant: Gloria Johnson-Hovey, Rochester, NY (US)

(72) Inventor: Gloria Johnson-Hovey, Rochester, NY (US)

(*) Notice: Subject to any disclaimer, the term of this patent is extended or adjusted under 35 U.S.C. 154(b) by 0 days.

(21) Appl. No.: 16/388,853

(22) Filed: Apr. 18, 2019

(65) Prior Publication Data

US 2020/0060226 A1 Feb. 27, 2020

Related U.S. Application Data

(63) Continuation-in-part of application No. 15/450,947, filed on Mar. 6, 2017, now abandoned.

(60) Provisional application No. 62/304,008, filed on Mar. 4, 2016.

(51) Int. Cl.
*A01K 1/035* (2006.01)

(52) U.S. Cl.
CPC .................................. *A01K 1/0353* (2013.01)

(58) Field of Classification Search
CPC .............................. A01K 1/0353; A01K 1/035
See application file for complete search history.

(56) References Cited

U.S. PATENT DOCUMENTS

| | | | |
|---|---|---|---|
| 5,226,384 A | 7/1993 | Jordan | |
| 5,685,257 A * | 11/1997 | Feibus | A01K 1/0353 119/28.5 |
| 6,196,156 B1 * | 3/2001 | Denesuk | A01K 1/0152 119/28.5 |
| 7,185,604 B2 * | 3/2007 | Holte | A01K 1/0353 119/28.5 |
| 7,231,888 B1 * | 6/2007 | Kelly | A01K 1/0353 119/161 |
| 9,648,846 B2 * | 5/2017 | Landers | A01K 1/0353 |
| 2006/0254526 A1 * | 11/2006 | Andriola | A01K 1/0353 119/28.5 |
| 2007/0056096 A1 * | 3/2007 | Assink | A47C 27/14 5/81.1 HS |
| 2008/0236501 A1 * | 10/2008 | Hargrave | A01K 1/0353 119/28.5 |
| 2008/0295775 A1 * | 12/2008 | Arvanites | A01K 1/0353 119/28.5 |
| 2010/0199917 A1 * | 8/2010 | Zine | A01K 1/0353 119/28.5 |
| 2011/0239946 A1 * | 10/2011 | Ogle | A01K 1/0353 119/28.5 |
| 2012/0199074 A1 * | 8/2012 | Song | A01K 1/0353 119/28.5 |
| 2012/0199075 A1 * | 8/2012 | Song | A01K 1/0353 119/28.5 |

(Continued)

*Primary Examiner* — Kristen C Hayes
(74) *Attorney, Agent, or Firm* — Charles Runyan; Runyan Law (57) ABSTRACT

A bed for an animal includes a cover/body and a pad/padding material within the cover/body. In a preferred embodiment, the cover/body includes a marine-grade vinyl material. Further, the padding includes a polyethylene terephthalate material and a durable foam material. Preferably, the padding includes three layers: two layers of polyethylene terephthalate material and one layer of durable foam material sandwiched therebetween. The bed for an animal is useful for providing a bed for the animal that is aesthetically pleasing and easily cleanable. In the preferred embodiment, the animal may be a dog.

18 Claims, 8 Drawing Sheets

(56) References Cited

U.S. PATENT DOCUMENTS

2014/0165923 A1\* 6/2014 Diamond ............ A01K 1/0353
 119/706
2014/0261190 A1 9/2014 Landers
2016/0037744 A1 2/2016 Rudin \* cited by examiner

BED FOR AN ANIMAL AND METHOD

CROSS-REFERENCE TO RELATED APPLICATION

The present application is a Continuation-in-Part and is related to and claims priority to U.S. Provisional Patent Application No. 62/304,008 filed Mar. 4, 2016, and pending U.S. Utility patent application Ser. No. 15/450,947 filed Mar. 6, 2017 which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of animal beds and more specifically relates to aesthetically pleasing and easily cleanable dog beds.

2. Description of Related Art

Animals may like to sleep in beds. Most animal beds are made from a polyfoam core covered with fabric. Unfortunately, these beds are generally not resistant to fluids. In fact, they have been found to soak up and retain body fluids which the animals naturally excrete. In other words, the bed structure must be washed repeatedly or simply disposed of. Repeated washing leads to increased stress on the connecting seams. In a short time, the bed can become stained and harbor odors, especially if the pet urinates, defecates or vomits in the bed.

The time-consuming task of laundering is inconvenient and problematic. Unzipping or generally removing the dirty item is often inconvenient and difficult. Further, laundering and/or removing can facilitate transmission of dirt from one place to another, increasing and complicating the task of cleaning. Conventional, reusable bed covers have the tendency to shrink, unravel and/or never fit the item from which it was removed, particularly after the conventional cover has been cleaned or laundered. Moreover, laundering and drying takes time, during which the item may be rendered useless and/or remain unprotected. In addition, discarding and replacing pet bedding on a frequent basis can become expensive and is an annoyance to the pet owner.

Many contaminants become difficult, or in some instances impossible, to remove from conventional pet beds. For instance, pet-related dirt such as mud, dirt, flea and tick feces, accidental discharges of urine, saliva, gland secretions, and blood appears to be pervasive and complicated to remove. Further to the complications that conventional pet beds can cause in terms of cleaning, they can also cause an eye sore within a home. Conventional beds may appear discolored, misshapen or stained, and often times the bed generally does not mesh with the furniture within the home. Thus, in light of the aforementioned disadvantages of the conventional bed for an animal, a suitable solution is desired.

U.S. Pat. No. 5,226,384 to Elizabeth S. Jordan relates to a damage and pest-resistant animal bed. The described damage and pest-resistant animal bed includes a resilient core having generally a slab shape and, surrounding and encasing the core, a cover formed of at least an aramid fabric sheet. In a preferred form, the cover is a laminate made of the aramid fabric sheet with a polyester fabric sheet laminated to it. Preferably these materials are respectively a KEVLAR® aramid sheet and a MYLAR® polyester sheet. The core of the bed is preferably made of resilient polymeric foam, rubber, fiber fill, wood shavings or wood chips, of which the foam or rubber is preferred. A soft cloth coverlet can be used to cover the entire bed if desired. The bed of this invention is highly resistant to destructive activities of the animal, such as biting or clawing. It is also impervious to water and to pest infestation.

BRIEF SUMMARY OF THE INVENTION

In view of the foregoing disadvantages inherent in the known animal bed art, the present disclosure provides a novel bed for an animal and method. The general purpose of the present disclosure, which will be described subsequently in greater detail, is to provide a bed for an animal that is durable, aesthetically pleasing and easily cleanable.

A bed for an animal is disclosed herein. The bed for an animal may include a body including an inner volume defined by an inner surface and an outer surface. In this embodiment, the outer surface may be configured to receive the animal. Further, the bed for an animal may also include a padding material configured to occupy the inner volume of the body. In some embodiments, the padding material may be removably replaceable such that it is adjustable.

The body may be donut-circular in shape. In this embodiment, the body may include an opening running around at least ⅓ of a circumference of the body. The opening may be configured to provide access to the inner volume of the body for removal and insertion of the padding material. In the preferred embodiment, the opening may include a zipper closure. Other fastening means may be used.

The padding material may include at least two layers. Some embodiments may include at least one layer of polyester material, and at least one layer of durable foam material. In the preferred embodiment, the polyester material may be polyethylene terephthalate. In addition, in the preferred embodiment, the durable foam material may have a thickness of at least 2 inches.

According to another embodiment, a method of using a bed for an animal is also disclosed herein. The method of using a bed for an animal may include resting the bed on a ground, wiping the outer surface of the body clean after the animal has vacated the bed, and optionally storing the bed away in between usage of the bed.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a bed for an animal and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to an animal bed and more particularly to a bed for an animal and method used to improve animal beds and to provide a bed for the animal that is aesthetically pleasing and easily cleanable.

Generally, the bed for an animal may include a comfortable foam insert and easy clean vinyl cover. The vinyl cover may be a tough marine vinyl. The vinyl may be manufactured in a variety of colors and its contemporary design may provide a fun accent piece in any home or room. The vinyl cover may be easily wiped clean, thus negating the need to use washing machines. The bed may be circular in shape. The bed may further include a zipper closure running around at least ⅓ of a circumference of the bed. The inside of the bed may include a polyethylene terephthalate such as DACRON® which may cover a durable upholstery foam which may be at least 2 inches in thickness.

Figure 1:
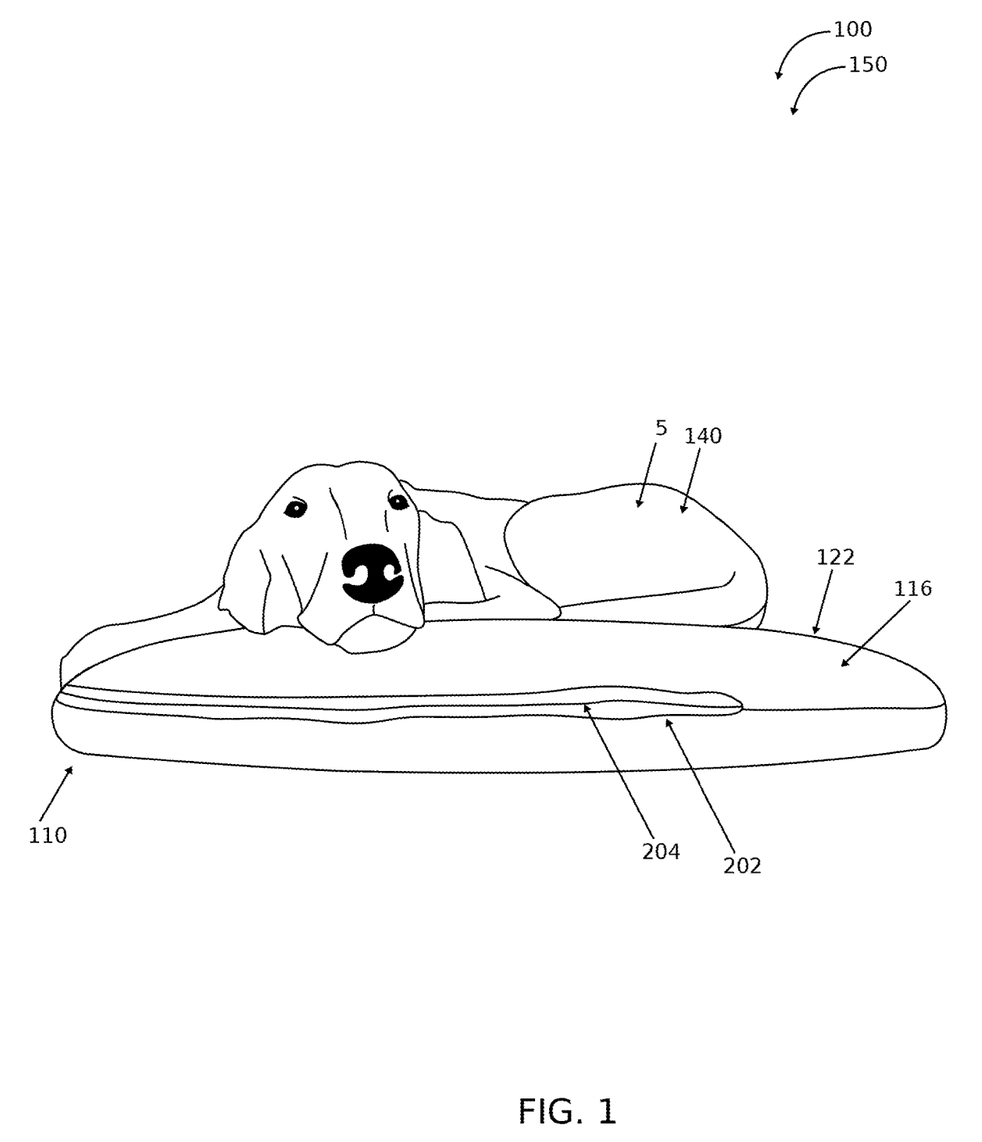
FIG. 1 is a perspective view of the bed for an animal during an 'in-use' condition, according to an embodiment of the disclosure.

Referring now more specifically to the drawings by numerals of reference, there is shown in FIGS. 1-8, various views of a bed for an animal ("bed" 100). FIG. 1 shows a bed 100 during an 'in-use' condition 150, according to an embodiment of the present disclosure. Here, the bed 100 may be beneficial for use by a user 140 to provide a bed 100 for the animal that is aesthetically pleasing and easily cleanable. As illustrated, the bed 100 may include a body 110 including an inner volume 112 defined by an inner surface 114 (FIG. 3) and an outer surface 116, and a padding material 120 (FIG. 3) configured to occupy the inner volume 112 of the body 110.

Figure 2A:
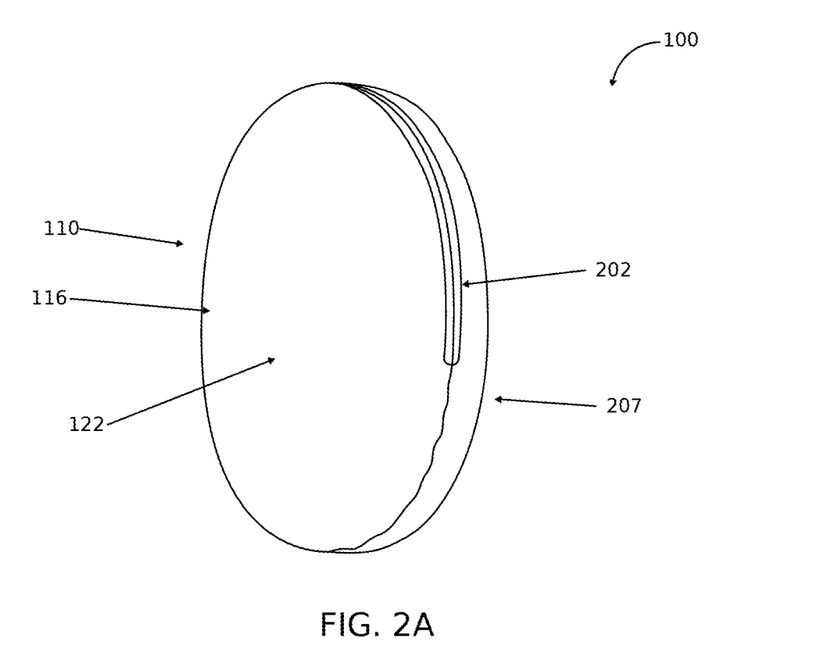
FIG. 2A is a perspective side view of the bed for an animal of FIG. 1 according to an embodiment of the present disclosure.
Figure 3:
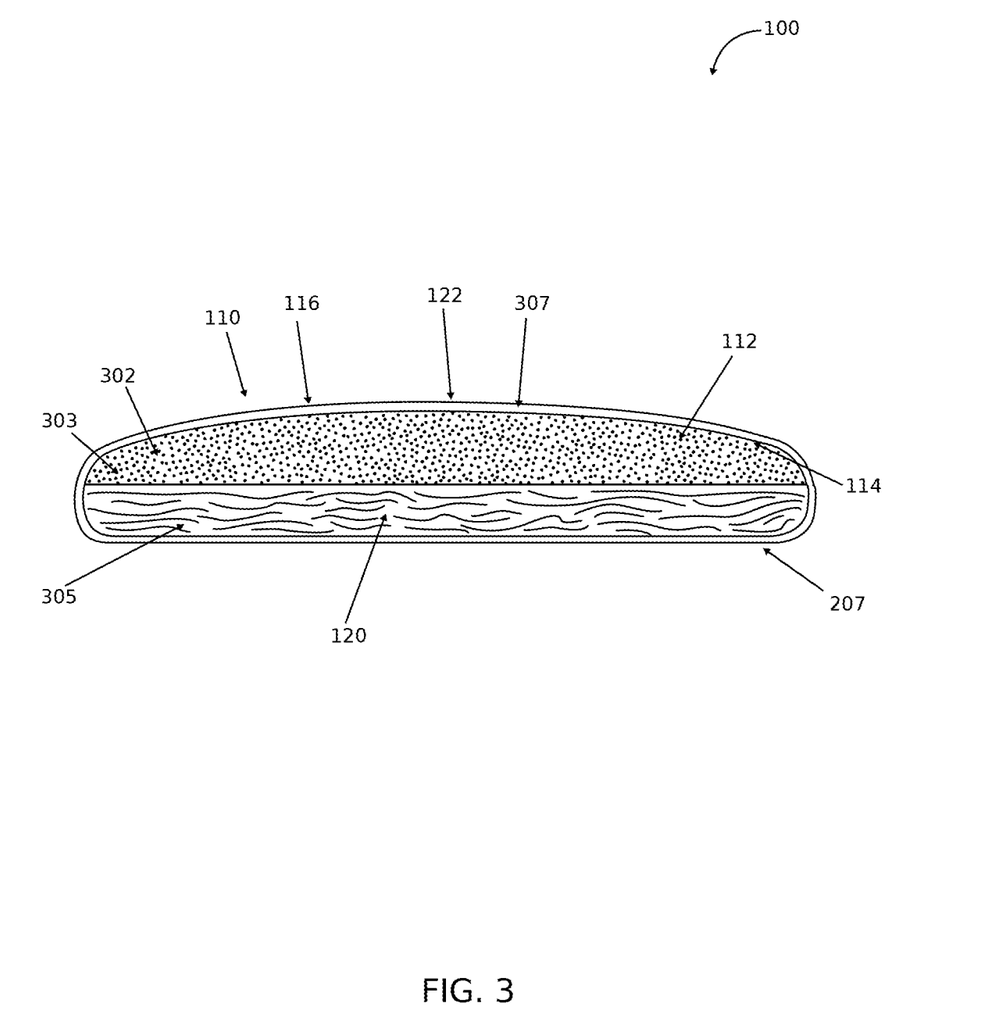
FIG. 3 is a perspective cut-away view of the bed for an animal of FIG. 2B, showing a padding material within the bed according to an embodiment of the present disclosure.

FIG. 2A shows the bed 100 of FIG. 1, according to an embodiment of the present disclosure. Illustrated here is a perspective side view to demonstrate components of the bed 100. As above, the bed 100 may include the body 110 including the inner volume 112 defined by the inner surface 114 (FIG. 3) and the outer surface 116. In this embodiment, the outer surface 116 may be configured to receive the animal 5. Further, the padding material 120 configured to occupy the inner volume 112 of the body 110 may be included (FIG. 3). In some embodiments, the padding material 120 may be removably replaceable.

In a preferred embodiment, the body 110 may be donut-circular in shape. In this embodiment, the body 110 may include an opening 202 running around at least ⅓ of a circumference of the body 110. In another embodiment, the opening 202 may run the whole circumference of the body 110. The opening 202 may be configured to provide access to the inner volume 112 of the body 110 for removal and insertion of the padding material 120. In the preferred embodiment, the opening 202 may include a zipper closure 204. Other embodiments may include hook and loop fasteners such as VELCRO®, buttons, snap fasteners or hook and eye closures.

Further, in the preferred embodiment, the body 110 may be composed of a marine-grade vinyl material 307. In this embodiment, the marine-grade vinyl material 307 may be durable and may be easily cleaned with a cleaning wipe or a spray bottle. As a result, there may be no need for a long process of cleaning the bed using a washing machine. The body may also comprise a material configured to prevent absorption of order. Further, the outer surface 116 of the body 110 may include a flat base 207 and a seat 122. In this embodiment, the seat 122 may be configured for receival of the animal 5 in a seated position and a lying position. In addition to this, the flat base 207 may be configured to rest parallel to a ground when the animal 5 is atop the seat 122 in the seated position or the lying position.

Figure 2B:
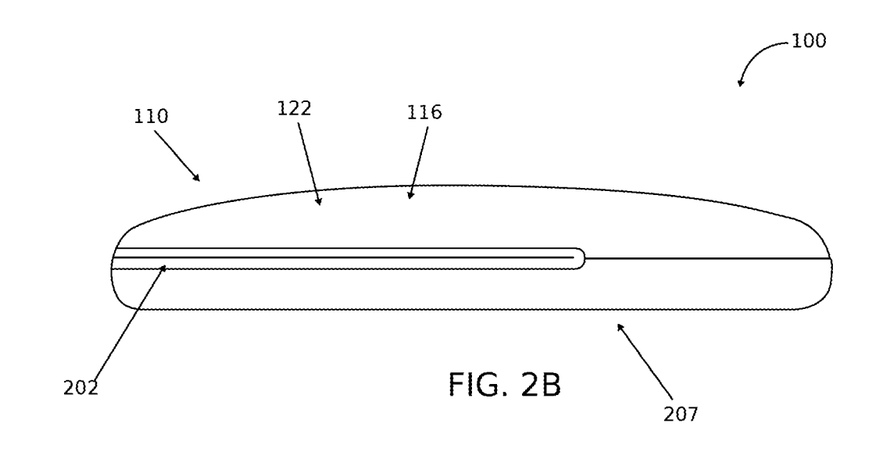
FIG. 2B is a perspective front view of the bed for an animal of FIG. 1, illustrating a thickness of the bed according to an embodiment of the present disclosure.

FIG. 2B shows the bed 100 of FIG. 1, illustrating a thickness of the bed 100 according to an embodiment of the present disclosure. The preferred embodiment of the bed 100 may be a bed for a dog 5. In this embodiment, the bed 100 may include a circular body 110 composed of the marine-grade vinyl material 307 and including the inner volume 112. The inner volume 112 may be defined by the inner surface 114 and the outer surface 116, and the outer surface 116 may be configured to receive the dog 5. Further, the bed for a dog 100 may include the padding material 120, which may be configured to occupy the inner volume 112 of the circular body 110.

The outer surface 116 of the body 110 may further include the flat base 207 and the seat 122. The seat 122 may be configured for receival of the animal 5 in the seated position and the lying position, and the flat base 207 may be configured to rest parallel to the ground when the animal 5 is atop the seat 122 in the seated position or the lying position.

Further, the body 110 may include the opening 202 running around at least ⅓ of the circumference of the body 110. In another embodiment, the opening 202 may run the whole circumference of the body 110. The opening 202 may be configured to provide access to the inner volume 112 of the body 110 for removal and insertion of the padding material 120. In the preferred embodiment, the opening 202 may include the zipper closure 204. Other embodiments may include hook and loop fasteners such as VELCRO®, buttons, snap fasteners or hook and eye closures.

FIG. 3 is a perspective cut-away view of the bed 100 of FIG. 2B. Shown here is a structure of the padding material according to an embodiment of the present disclosure. In one embodiment, the padding material 120 may include at least two layers. Some embodiments may include at least one layer of polyester material 302, and at least one layer of durable foam 305 material. In the preferred embodiment, the polyester material 302 may be polyethylene terephthalate 303 and the durable foam 305 material may have a thickness of at least 2 inches. In other embodiments, the foam material may have a thickness of between 2 inches and 4 inches. In the preferred embodiment, the padding material 120 may include at least one layer of polyethylene terephthalate 303 and at least one layer of durable foam 305. In some embodiments, the padding material 120 may be removably replaceable. The padding material 120 may be configured to provide comfort to the animal 5 and may comprise a material configured to prevent absorption of odor.

Figure 4:
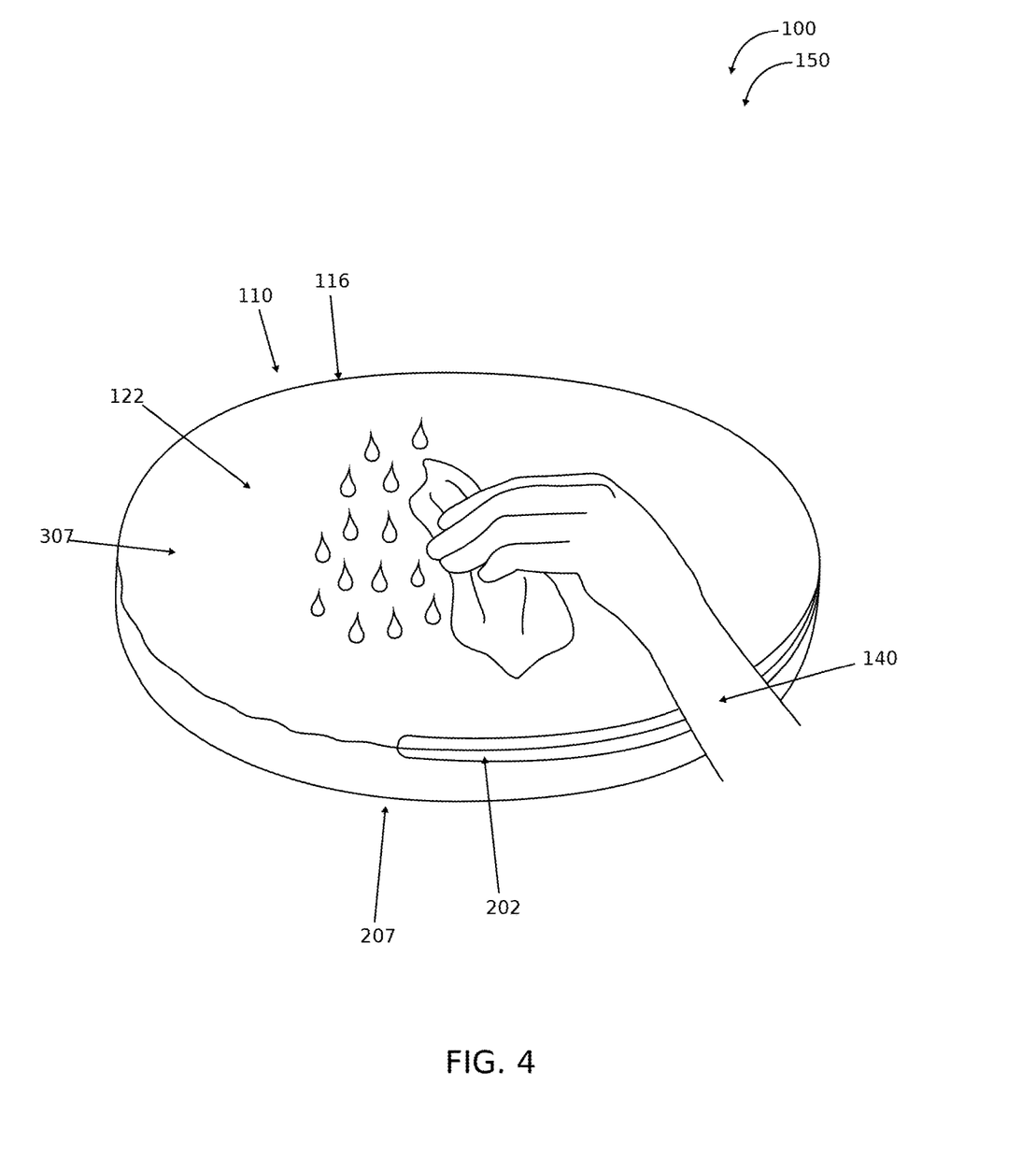
FIG. 4 is a perspective view of the bed for an animal in an 'in-use' condition and illustrating the bed being cleaned according to an embodiment of the present disclosure.

FIG. 4 is a perspective view of the bed 100 of FIG. 1, according to an embodiment of the present disclosure. Shown here is the bed 100 being cleaned by a user 140. As above, the body 110 may be composed of a marine-grade vinyl material 307. In this embodiment, the marine-grade vinyl material 307 may be durable and may be easily cleaned with the cleaning wipe or the spray bottle. As a result, there may be no need to clean the bed using the washing machine. The body may also comprise the material configured to prevent absorption of odor.

The bed 100 may be manufactured in a variety of sizes to accommodate a variety of differently sized animals 5. The bed 100 may be of a size to fit a dog carrier or a dog crate. Further to this, the bed may be manufactured in a variety of colors. In one embodiment, the bed 100 may be of an attractive appearance to create an aesthetically pleasing accent to a home. In another embodiment, the bed 100 may be compact and easily stored away.

Figure 5:
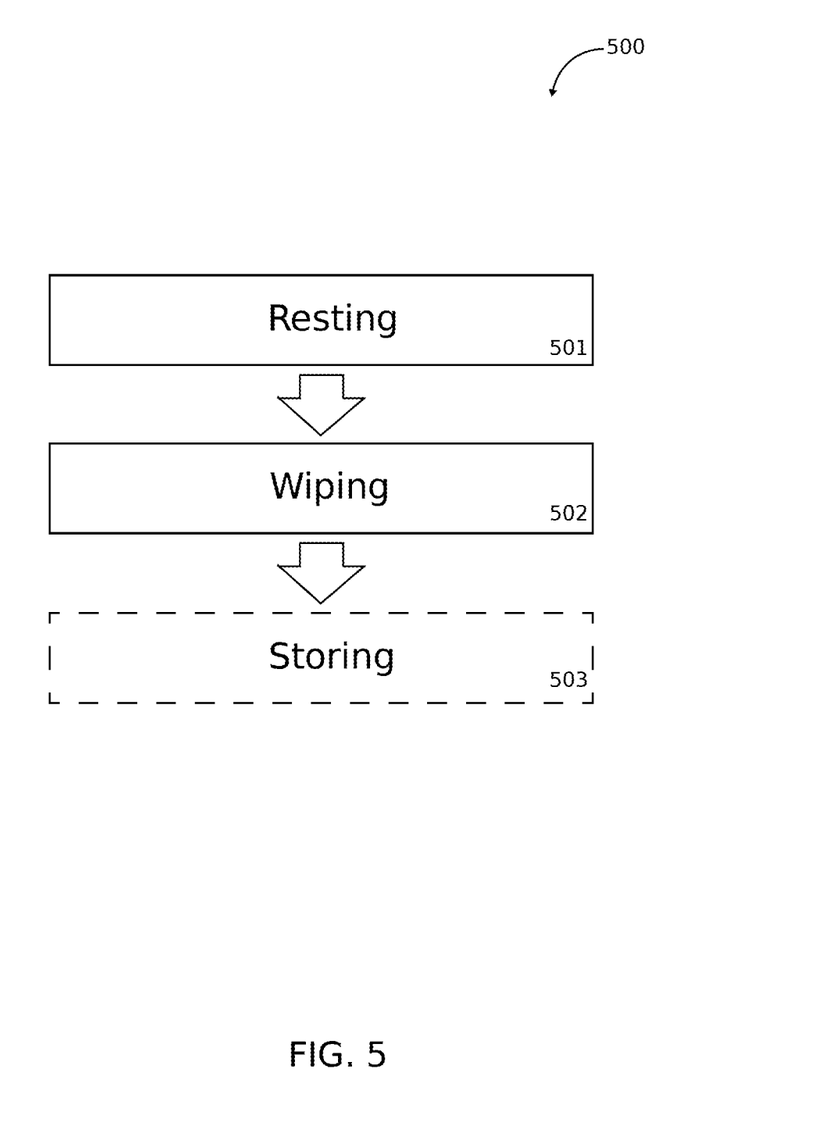
FIG. 5 is a flow diagram illustrating a method of using a bed for an animal, according to an embodiment of the present disclosure.

FIG. 5 is a flow diagram illustrating a method of using 500 a bed for an animal, 100 according to an embodiment of the present disclosure. In particular, the method of using 500 a bed for an animal 100 may include one or more components or features of the bed for an animal 100 as described above. As illustrated, the method of using 500 a bed for an animal 100 may include the steps of: step one 501, resting the bed 100 on a ground (the bed 100 including the body 110 having the outer surface 116, the outer surface 116 configured for receival of the animal 5); step two 502, wiping the outer surface 116 of the body 110 clean after the animal 5 has vacated the bed 100; and step three 503, storing the bed 100 away in between usage of the bed 100. Adjusting and cleaning the bed 100 may be other steps.

It should be noted that step 503 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using a bed for an animal (e.g., different step orders within above-mentioned list, elimination or addition of certain steps, including or excluding certain maintenance steps, etc.), are taught herein.

Figure 6:
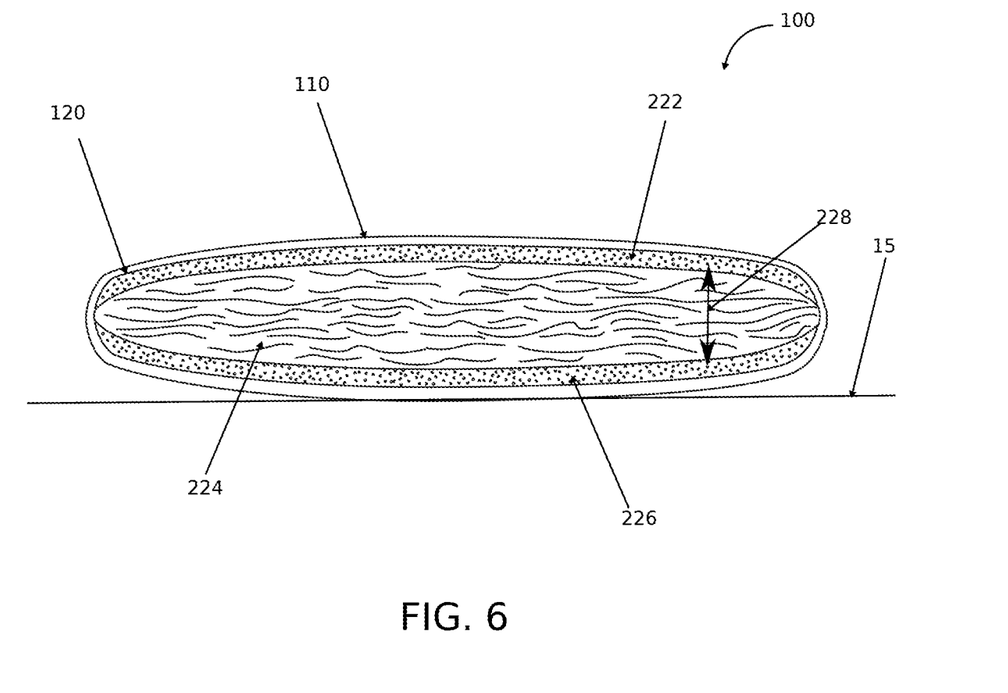
FIG. 6 is a side cutaway perspective view of the bed for an animal according to an embodiment of the present disclosure.

FIG. 6 is a side cutaway view of the bed 100 of FIG. 1, according to an embodiment of the present disclosure. The bed 100 may be configured for placement on a substantially horizontal floor-surface 15. The bed may include a pad 120 (padding material 120) including a first cushioned layer 222, a firm layer 224 and a second cushioned layer 226. The first cushioned layer 222 and the second cushioned layer 226 may comprise the polyester material. Preferably, the polyester material may be the polyethylene terephthalate material. The first cushioned layer 222 and the second cushioned layer 226 may provide comfort to the animal 5. Further, the firm layer 224 may comprise the durable foam material to provide support to the bed, and thus, the animal 5 (FIG. 1). The firm layer 224 may preferably include the thickness 228 of 2 inches. In other embodiments, a thickness 228 of between 1-3 inches may be contemplated. Preferably, the firm layer 224 may include enough thickness to provide support, but may be thin enough to allow for easy storage of the bed 100.

The firm layer 224 may be sandwiched between the first cushioned layer 222 and the second cushioned layer 226 in a vertical direction relative to the substantially horizontal floor-surface 15. For example, the first cushioned layer 222 may be stacked either on top of, or below, the firm layer 224 (depending on orientation of the bed) and the second cushioned layer 226 would be opposite the first cushioned layer 222, with the firm layer 224 in a middle thereof. The first cushioned layer 222 and the second cushioned layer 226 may be substantially equal in shape to the firm layer 224. Preferably, the bed 100 may be symmetrical across a horizontal plane thereof, such that the bed is reversible. For example, with the pad 120 (padding material 120) being layered with the firm layer 224 being sandwiched between the first cushioned layer 222 and the second cushioned layer 226, it allows the bed 100 to be turned "upside down" and remain the same, as either way, a cushioned layer (222, 226) is on top and the firm layer 224 is in the middle.

The first cushioned layer 222 and the second cushioned layer 226 may be permanently attached to the firm layer 224 to form a single-unit. The first cushioned layer 222 and the second cushioned layer 226 may be fused to the firm layer 224. In one embodiment, the first cushioned layer 222 and the second cushioned layer 226 may be persistently attached to the firm layer 224 via an adhesive. In one embodiment, the first cushioned layer 222 and the second cushioned layer 226 may each include a size larger than the firm layer 224. The size may enable the first cushioned layer 222 and the second cushioned layer 226 to wrap around the firm layer 224.

Figure 7:
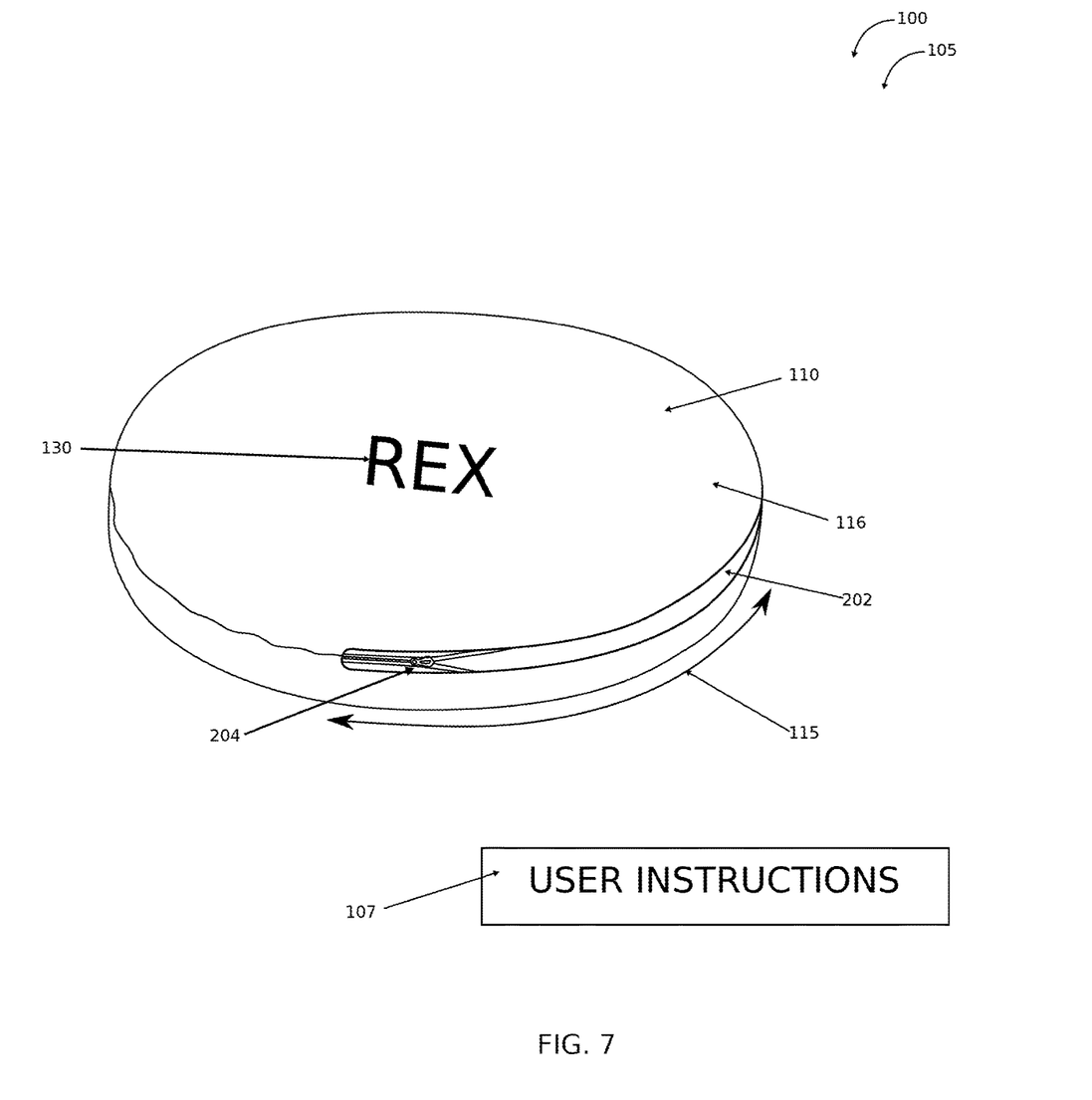
FIG. 7 is a top side perspective view of the bed for an animal according to an embodiment of the present disclosure.

FIG. 7 is a top-side view of the bed 100 of FIG. 1, according to an embodiment of the present disclosure. The bed 100 may include a cover 110 (body 110) including an inner volume 112 (FIG. 6) being defined by an outer shell 116 (outer surface 116). The inner volume 112 (FIG. 6) may be sized to receive the pad 120 (padding material 120) (FIG. 6) therein and configured to substantially conform to the pad 120 (padding material 120) (FIG. 6). To aid in this the cover 110 (body 110) may comprise a substantially stretchable material. Preferably, the substantially stretchable material may be configured to tightly conform to the pad 120 (padding material 120) (FIG. 6) to hold the bed 100 together as one and create a uniform shape. The cover 110 (body 110) may comprise the marine-grade vinyl material.

The cover 110 (body 110) may further include the opening 202 configured to permit entrance and exit of the pad into, and out of, the inner volume 112 (FIG. 6). In one embodiment, the opening 202 may be located around at least a half of a periphery 115 of the cover 110 (body 110). The opening 202 may include a fastener, which may be the zipper closure 204.

Further, as shown, at least one side of the outer shell 116 (outer surface 116) may include functional indicia 130 thereon. The functional indicia 130 may be affixed to the outer shell 116 (outer surface 116) in such a way that prevents easy removal of the functional indicia 130. For example, the functional indicia 130 may be embroidered, screen-printed, laser-printed, ironed, etc. The functional indicia 130 may include the animals name (as shown in this figure), but is contemplated to include any combination of letters or numbers. Further, pictures, logos, and any kind of graphic may be added to the at least one side of the outer shell 116 (outer surface 116).

In one embodiment, the bed for the animal 100 may include the set of instructions 107 and may be configured as the kit 105. In one embodiment, a plurality of covers 110 (body 110) may be included such that a user is able to change the cover 110 (body 110) based on preference or if the cover 110 (body 110) just needs to be cleaned, for example.

Figure 8:
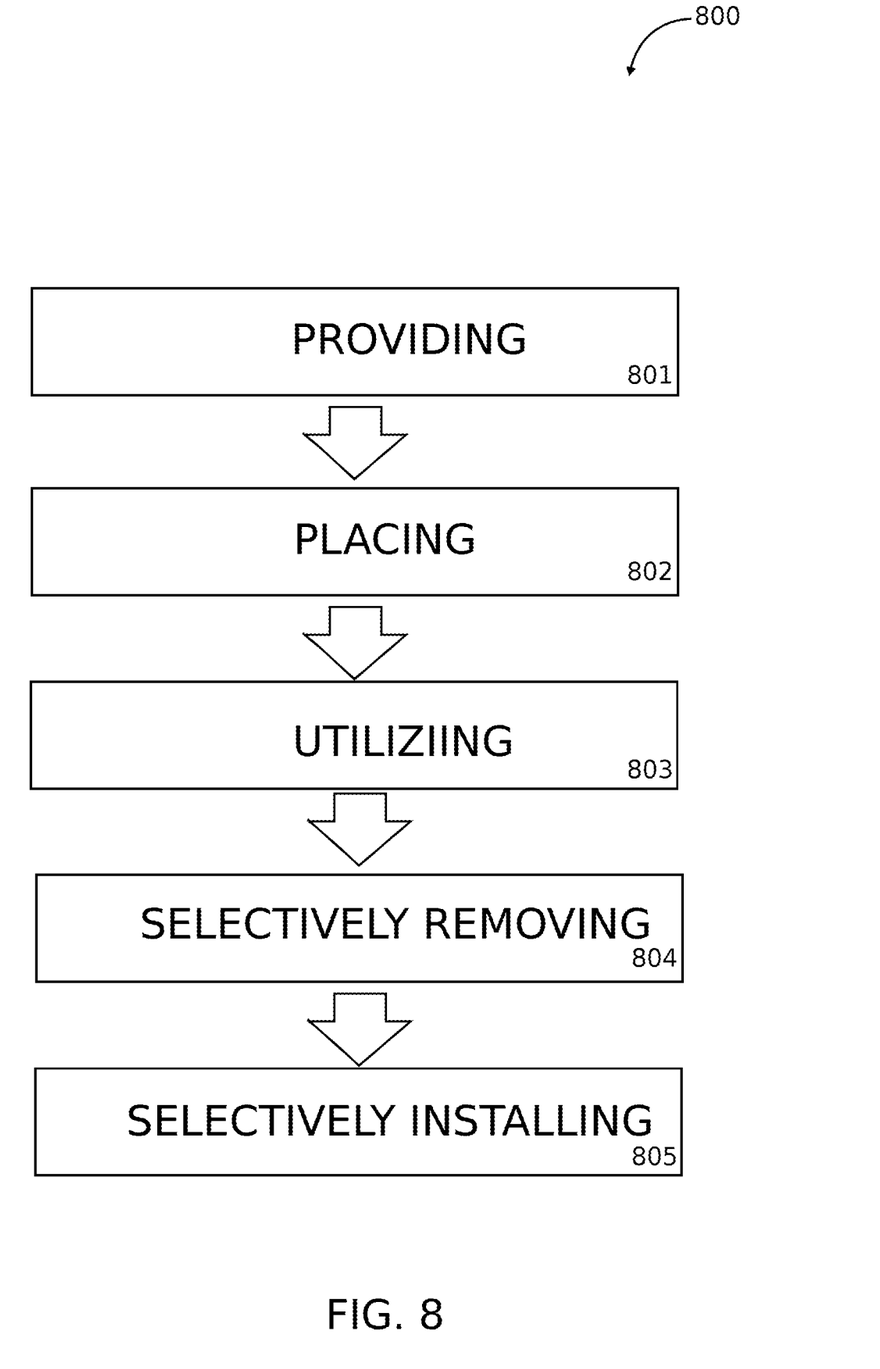
FIG. 8 is a flow diagram illustrating a method of using a bed for an animal, according to an embodiment of the present disclosure.

FIG. 8 is a flow diagram illustrating a method of using 800 a bed for an animal, 100 according to an embodiment of the present disclosure. In particular, the method of using 800 a bed for an animal 100 may include one or more components or features of the bed for an animal 100 as described above. As illustrated, the method of using 500 a bed for an animal 100 may include the steps of: providing 801 the bed 100 as above; placing 802 the best on the substantially horizontal surface; utilizing 803 the bed 100; selectively removing 804 the pad from the inner volume of the cover; and selectively installing 805 the pad back into the inner volume of the cover.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A bed for an animal, the bed configured for placement on a substantially horizontal floor-surface, the bed comprising:
    a pad including a first cushioned layer, a firm layer and a second cushioned layer, the firm layer being sandwiched between the first cushioned layer and the second cushioned layer in a vertical direction relative to the substantially horizontal floor-surface, the first cushioned layer and the second cushioned layer persistently attached to the firm layer to form a single-unit; and
    a cover including an inner volume being defined by an outer shell, the inner volume being sized to receive the pad therein and configured to substantially conform to the pad, the cover further including an opening configured to permit entrance and exit of the pad into, and out of, the inner volume,
    wherein the first cushioned layer and the second cushioned layer are larger than the firm layer and
    the first cushioned layer and the second cushioned layer are large enough to wrap around the firm layer.

2. The bed for an animal of claim 1, wherein the first cushioned layer comprises a polyester material.

3. The bed for an animal of claim 2, wherein the second cushioned layer comprises the polyester material.

4. The bed for an animal of claim 3, wherein the polyester material is polyethylene terephthalate.

5. The bed for an animal of claim 4, wherein the fastener is a zipper closure.

6. The bed for an animal of claim 1, wherein the firm layer comprises a durable foam material.

7. The bed for an animal of claim 6, wherein the firm layer includes a thickness of between 1-3 inches.

8. The bed for an animal of claim 7, wherein the firm layer includes a thickness of 2 inches.

9. The bed for an animal of claim 1, wherein the first cushioned layer and the second cushioned layer are persistently attached to the firm layer via an adhesive.

10. The bed for an animal of claim 1, wherein the cover comprises a substantially stretchable material configured to tightly conform to the pad.

11. The bed for an animal of claim 10, wherein the cover comprises a marine-grade vinyl material.

12. The bed for an animal of claim 1, wherein the opening is located around at least a half of a periphery of the cover.

13. The bed for an animal of claim 12, wherein the opening includes a fastener.

14. The bed for an animal of claim 1, wherein at least one side of the outer shell includes functional indicia thereon.

15. The bed for an animal of claim 1, wherein the bed is symmetrical across a horizontal plane thereof, such that the bed is reversable.

16. A bed for an animal, the bed configured for placement on a substantially horizontal floor-surface, the bed comprising:
    a pad including a first cushioned layer being made of a polyethylene terephthalate material, a firm layer being made of a durable foam material, and a second cushioned layer being made of the polyethylene terephthalate material, the firm layer being sandwiched between the first cushioned layer and the second cushioned layer in a vertical direction relative to the substantially horizontal floor-surface, the first cushioned layer and the second cushioned layer being persistently attached to the firm layer via an adhesive to form a single-unit; and
    a cover being made of a vinyl material, the cover including an inner volume being defined by an outer shell, the inner volume being sized to receive the pad therein and configured to substantially conform to the pad, the cover further including an opening configured to permit entrance and exit of the pad into, and out of, the inner volume; and
    functional indicia located on at least one side of the outer shell;
    wherein the first cushioned layer and the second cushioned layer are substantially equal in shape to the firm layer;

wherein the first cushioned layer and the second cushioned layer each include a size larger than the firm layer, and wherein the size enables the first cushioned layer and the second cushioned layer to wrap around the firm layer;

wherein the firm layer includes a thickness of between 1-3 inches;

wherein the opening is located around at least a half of a periphery of the cover;

wherein the opening includes a fastener;

wherein the fastener is a zipper closure;

and wherein the bed is symmetrical across a horizontal plane thereof, such that the bed is reversable.

17. The bed for an animal of claim 16, further comprising set of instructions wherein the bed and instructions are arranged as a kit.

18. A method of using a bed for an animal, the bed configured for placement on a substantially horizontal floor-surface, the method comprising the steps of:

providing the bed for the animal including:

a pad including a first cushioned layer, a firm layer and a second cushioned layer, the firm layer being sandwiched between the first cushioned layer and the second cushioned layer in a vertical direction relative to the substantially horizontal floor-surface, the first cushioned layer and the second cushioned layer being persistently attached to the firm layer to form a single-unit;

and a cover including an inner volume being defined by an outer shell, the inner volume being sized to receive the pad therein and configured to substantially conform to the pad, the cover further including an opening configured to permit entrance and exit of the pad into, and out of, the inner volume;

placing the bed on the substantially horizontal surface;

utilizing the bed;

selectively removing the pad from the inner volume of the cover;

and selectively installing the pad back into the inner volume of the cover.

* * * * *